(12) United States Patent
Pekarske et al.

(10) Patent No.: US 12,301,731 B2
(45) Date of Patent: May 13, 2025

(54) METHODS AND APPARATUS TO RENEW DIGITAL CERTIFICATES

(71) Applicant: ZEBRA TECHNOLOGIES CORPORATION, Lincolnshire, IL (US)

(72) Inventors: Andrew J. Pekarske, Mundelein, IL (US); Jared Coy Roundy, Meridian, ID (US); Christian S. Rothwell, North Kingstown, RI (US)

(73) Assignee: Zebra Technologies Corporation, Lincolnshire, IL (US)

( * ) Notice: Subject to any disclaimer, the term of this patent is extended or adjusted under 35 U.S.C. 154(b) by 626 days.

(21) Appl. No.: 16/456,663

(22) Filed: Jun. 28, 2019

(65) Prior Publication Data

US 2020/0412552 A1 Dec. 31, 2020

(51) Int. Cl.
*H04L 9/32* (2006.01)
(52) U.S. Cl.
CPC .................. *H04L 9/3268* (2013.01)
(58) Field of Classification Search
CPC .................................................. H04L 9/3268
See application file for complete search history.

(56) References Cited

U.S. PATENT DOCUMENTS

| | | | |
|---|---|---|---|
| 5,005,200 A | 4/1991 | Fischer | |
| 6,044,462 A | 3/2000 | Zubeldia et al. | |
| 6,304,974 B1 | 10/2001 | Samar | |
| 6,715,073 B1 | 3/2004 | An et al. | |
| 7,120,929 B2 | 10/2006 | Beattie et al. | |
| 7,707,406 B2 | 4/2010 | Qiu | |
| 8,560,851 B1* | 10/2013 | Cherukumudi | H04L 9/3263 713/168 |
| 8,874,768 B2 | 10/2014 | Holden et al. | |
| 9,407,644 B1* | 8/2016 | Cheng | H04L 63/1408 |
| 9,641,344 B1* | 5/2017 | Kim | H04L 9/3263 |
| 10,454,690 B1* | 10/2019 | Popoveniuc | H04L 9/088 |
| 11,323,274 B1* | 5/2022 | Bowen | H04L 9/3268 |
| 2002/0071560 A1 | 6/2002 | Kurn et al. | |

(Continued)

FOREIGN PATENT DOCUMENTS

| | | |
|---|---|---|
| CN | 1556449 A | 12/2004 |
| EP | 1323259 B1 | 10/2011 |

(Continued)

OTHER PUBLICATIONS

International Search Report and Written Opinion for International Application No. PCT/2020/27268 mailed on Jun. 25, 2020.

(Continued)

*Primary Examiner* — Vance M Little

(57) ABSTRACT

An example disclosed method for use in a device configured to communicate using digital certificates includes, in response to a request, receiving a digital certificate for use in secure communications between the device and another device; evaluating, using a logic circuit, the digital certificate to determine a validity of the digital certificate; when the digital certificate is valid, allowing use of the digital certificate by the device; and when the digital certificate is invalid, preventing use of the digital certificate by the device.

21 Claims, 5 Drawing Sheets

(56) References Cited

U.S. PATENT DOCUMENTS

| | | | |
|---|---|---|---|
| 2002/0080975 A1* | 6/2002 | Rich | H04L 9/3263 380/286 |
| 2005/0069136 A1* | 3/2005 | Thornton | H04L 63/20 380/277 |
| 2005/0076201 A1 | 4/2005 | Thornton et al. | |
| 2007/0005981 A1* | 1/2007 | Miyazawa | H04L 9/3268 713/176 |
| 2007/0260874 A1* | 11/2007 | Adams | H04L 9/3263 713/156 |
| 2008/0086633 A1 | 4/2008 | Anderson et al. | |
| 2011/0010543 A1 | 1/2011 | Schmidt et al. | |
| 2011/0058673 A1 | 3/2011 | Zheng et al. | |
| 2011/0113239 A1* | 5/2011 | Fu | H04L 9/3226 713/156 |
| 2012/0014484 A1 | 1/2012 | Ameti et al. | |
| 2013/0132718 A1 | 5/2013 | Agrawal | |
| 2013/0238895 A1* | 9/2013 | Dixon | H04L 63/0823 713/156 |
| 2014/0075185 A1 | 3/2014 | Dragomir et al. | |
| 2014/0283054 A1 | 9/2014 | Janjua et al. | |
| 2014/0337616 A1 | 11/2014 | Kimberly | |
| 2017/0279619 A1* | 9/2017 | Yang | H04L 9/3268 |
| 2017/0346853 A1* | 11/2017 | Wyatt | H04L 9/3265 |
| 2018/0062859 A1 | 3/2018 | Janjua et al. | |
| 2018/0227292 A1* | 8/2018 | Golshan | H04L 63/0823 |
| 2019/0340364 A1* | 11/2019 | Liu | H04L 9/0894 |
| 2020/0162247 A1* | 5/2020 | Nix | H04L 63/0838 |

FOREIGN PATENT DOCUMENTS

| | | | | |
|---|---|---|---|---|
| GB | 2561948 A | | 10/2018 | |
| JP | 2013232767 A | * | 11/2013 | H04L 63/0823 |

OTHER PUBLICATIONS

Belgian Novelty Search Report for Belgian Patent Application No. 2020/5477 mailed on Mar. 6, 2021.

Examination Report for the Great Britain Application No. 2114335.9 mailed on Apr. 21, 2023.

* cited by examiner

METHODS AND APPARATUS TO RENEW DIGITAL CERTIFICATES

FIELD OF DISCLOSURE

This disclosure is generally related to electronic communication security and, more particularly, methods and apparatus to renew digital certificates.

BACKGROUND

Devices that communicate externally typically include one or more forms of security to, for example, encrypt data, decrypt data, and/or authenticate sources of data. One type of security technique, namely asymmetric encryption, involves public and private key pairs. Broadly stated, each device securely stores a private key that is mathematically linked to a corresponding public key. The public key, which is shared with external devices, is used to encrypt information. The private key, which is not shared with external devices, is used to decrypt data that was encrypted using the corresponding public key.

Some systems share the public key via a digital certificate to provide an additional layer of security around such keys. Specifically, the digital certificate acts as a verification of the validity of the public key. In most instances, a certificate authority acts as a trusted third party by independently verifying the authenticity of the digital certificate (and the public key included therein) and applying a trusted electronic signature to the digital certificate. When a device receives a digital certificate signed by the trusted certificate authority, the device is assured that the public key within the digital certificate is trustable. Put another way, the signed digital certificate ensures a receiver thereof that the sender of the digital certificate is the true owner of the corresponding public key.

DETAILED DESCRIPTION

Figure 1:
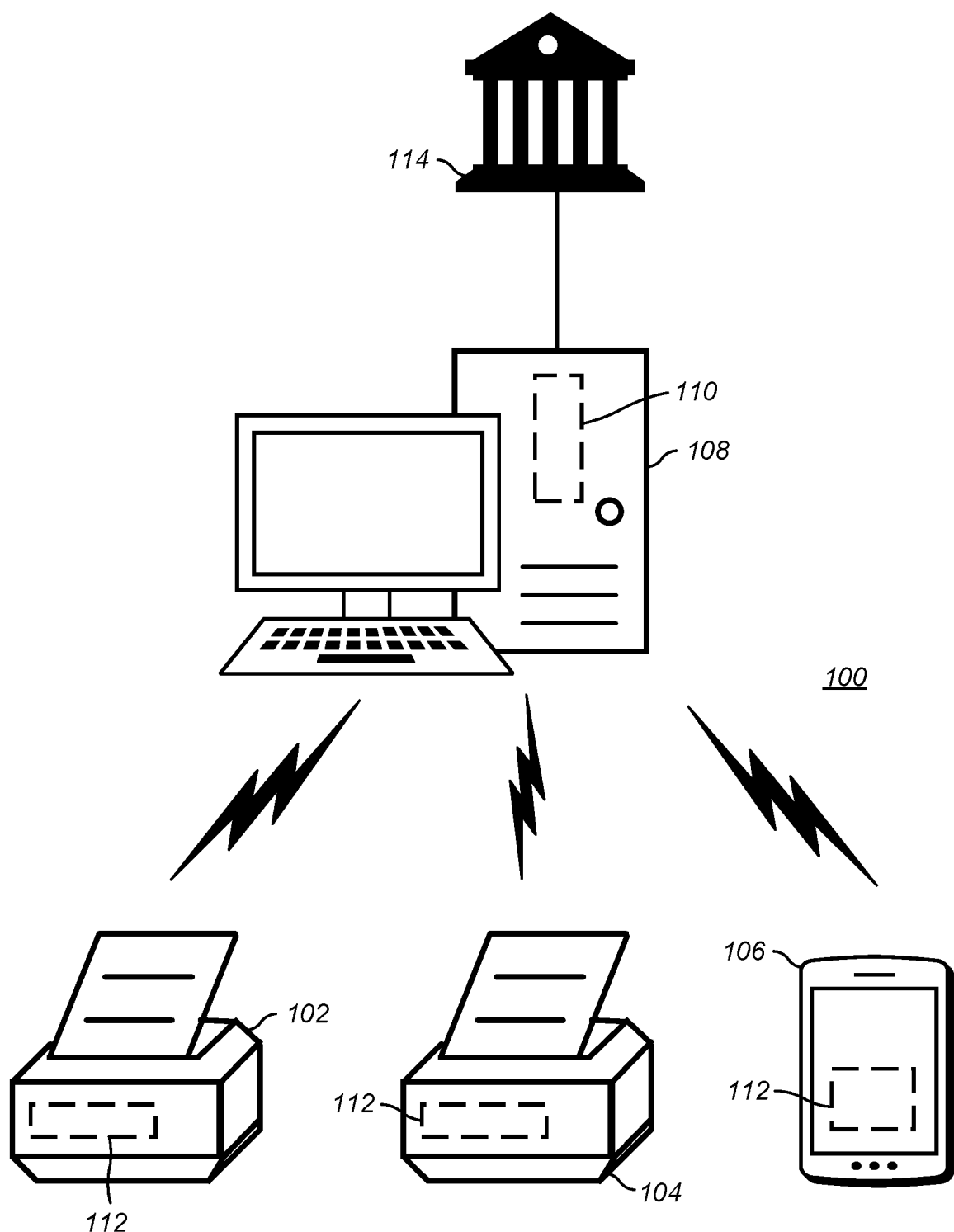
FIG. 1 is a diagram of a system including instances of a connection manager and a device profile manager constructed in accordance with teachings of this disclosure.

Teachings of this disclosure are described in connection with media processing devices, such as printers, and mobile computing devices. However, teachings of this disclosure are applicable to any suitable type of device that utilizes digital certificates. For example, while teachings of this disclosure are described below in connection with printer, mobile computing devices, and data associated with the same, teachings of this disclosure may be implemented in personal computers, routers, enterprise equipment, wearable computing devices, etc.

Media processing devices are tasked with, for example, generating indicia on and/or encoding media in accordance with received print and/or encode instructions. The instructions may be received from an external source, such as a computer in communication with the media processing device via a network (e.g., the Internet or an intranet). That is, the media processing device is accessible by a remote or external machine.

The media processing device may implement one or more measures to secure electronic communications with the external machine(s). For example, a media processing device may use an encryption/decryption scheme that utilizes digital certificates to verify an identity of an owner of a public key (e.g., in an asymmetric encryption scheme). If the digital certificate is signed by a trusted third-party certificate authority tasked with verifying ownership of a public key, a receiver of the digital certificate (and the accompanying public key) can rest assured that the public key was indeed sent by the listed owner of the public key.

To increase their effectiveness as security measures, digital certificates have expiration dates. The lifespan of a digital certificate is customizable. While some digital certificates last multiple years, others may last a few days depending on a desired or required level of security. As such, digital certificates require periodic renewal.

A new digital certificate meant to replace an imminently expiring one may include one or more errors that render communication based on the digital certificate inoperable. Additionally or alternatively, an incorrect digital certificate may be sent to a device, which would also render communication based on the digital certificate inoperable. Should a device install (i.e., place) an inoperable digital certificate, one or more services of that device reliant on the digital certificate cease operation. That is, when a device receives a faulty digital certificate and attempts to use the same, at least one function of the device shuts down. In some instances, shutdowns translate into complete downtime. For example, when the inoperable function is an interface for receiving print instructions, the printer is completely incapable of receiving instructions and, thus, performing its core function. For many devices, such as printers with a limited user interface, returning to functionality after a shutdown due to a problematic digital certificate is a time-intensive operation, sometimes requiring manual interaction with the device and/or a service visit from a technician.

Known devices are vulnerable to inoperability due to an erroneous or faulty digital certificate. That is, communication interfaces of known devices are negatively impacted by the installation (i.e., placement) of digital certificates that render the communication interfaces inoperable. For many devices, such as printers, the communication interface serves a core function, the performance of which impacts the main purpose of the machine, namely, to receive data and to print and/or encode media based on the received data. Accordingly, devices would benefit from improvement to the functionality of communication interfaces by ensuring that the communication interfaces are not rendered inoperable by faulty digital certificates.

To avoid downtime associated with erroneous or faulty digital certificates as experienced by known systems, example methods and apparatus disclosed herein check the integrity of received digital certificates before installing (i.e., placing or storing) the same on the receiving device. That is, example methods and apparatus disclosed herein determine whether a received digital certificate is problematic in any way (e.g., according to customizable criteria) before storing the digital certificate locally. In response to identifying an issue or error with the digital certificate, examples methods and apparatus disclosed herein explicitly prohibit use of the digital certificate by, for example, discarding the same and restricting use of that digital certificate on that device. Additionally, example methods and apparatus disclosed herein report findings that indicate a problem with a digital certificate such that a new digital certificate can be obtained prior to expiration of the version of the digital certificate currently being used by the device. Through use of example methods and apparatus disclosed herein, the device will not attempt to use a faulty or erroneous digital certificate, which would otherwise result in downtime of the device by rendering a communication interface inoperable. Instead, example methods and apparatus disclosed herein prevent the faulty and/or erroneous digital certificate from causing downtime of the device.

FIG. 1 depicts a system 100 including a plurality of devices 102-106 in communication with (e.g., wired, wireless, directly, over a network) a host 108 tasked with managing one or more aspects or functions of the plurality of device 102-106. Each of the devices 102-106 includes a communication interface to transmit and receive data, including to and from the host 108. The host 100 is any suitable type of computing device, such as a server.

The example host of FIG. 1 includes a device profile manager 110 configured to, among other tasks, cooperate with a connection manager 112 implemented on each of the plurality of devices 102-106. Generally, the device profile manager 110 maintains a report of digital certificates stored on the plurality of devices 102-106 and works with the respective instances of the connection manager 112 on the devices 102-106 to renew the digital certificates used by the devices 102-106. Each of the device 102-106 may have any number of digital certificates. For example, one of the devices 102, which is a printer in the example of FIG. 1, has multiple digital certificates, each dedicated to a different service or operation. Another one of the devices 106, which is a mobile computing device in the example of FIG. 1, has one digital certificate dedicated to one service or operation. As described above, the digital certificates include encryption information and are used to verify an identity of the owner of the encryption information. In the example of FIG. 1, the encryption information in the digital certificate is a public key of a public/private key pair encryption/decryption scheme. However, examples disclosed herein are applicable to any type of digital certificate.

The example device profile manager 110 of FIG. 1 receives certificate signing requests (CSRs) from the connection managers 112 and sends the CSRs to a certificate authority 114. A CSR is a request for a digital certificate and, in the example of FIG. 1, is sent from the devices 102-106 to the host 108, which sends the CSR to the certificate authority 114. The sender of the CSR asks the certificate authority 114 to provide a signed (i.e., an electronic stamp of approval) digital certificate including the public key included in the CSR. The certificate authority 114 evaluates contents of the CSR to determine whether the requester is the true owner of the underlying encryption data (e.g., public key) and signs the corresponding digital certificate if that verification is made. Accordingly, a digital certificate signed by the certificate authority indicates to recipients of the signed digital certificate that the sender of the digital certificate is the true owner of the encryption information (e.g., public key) included in the digital certificate. Therefore, a holder of the digital certificate can provide the same to external machines such that the external machines trust the holder. Notably, without a valid digital certificate for a particular function of, for example, the printer 102, the printer 102 cannot perform that function (e.g., receive print instructions from an external machine).

Figure 2:
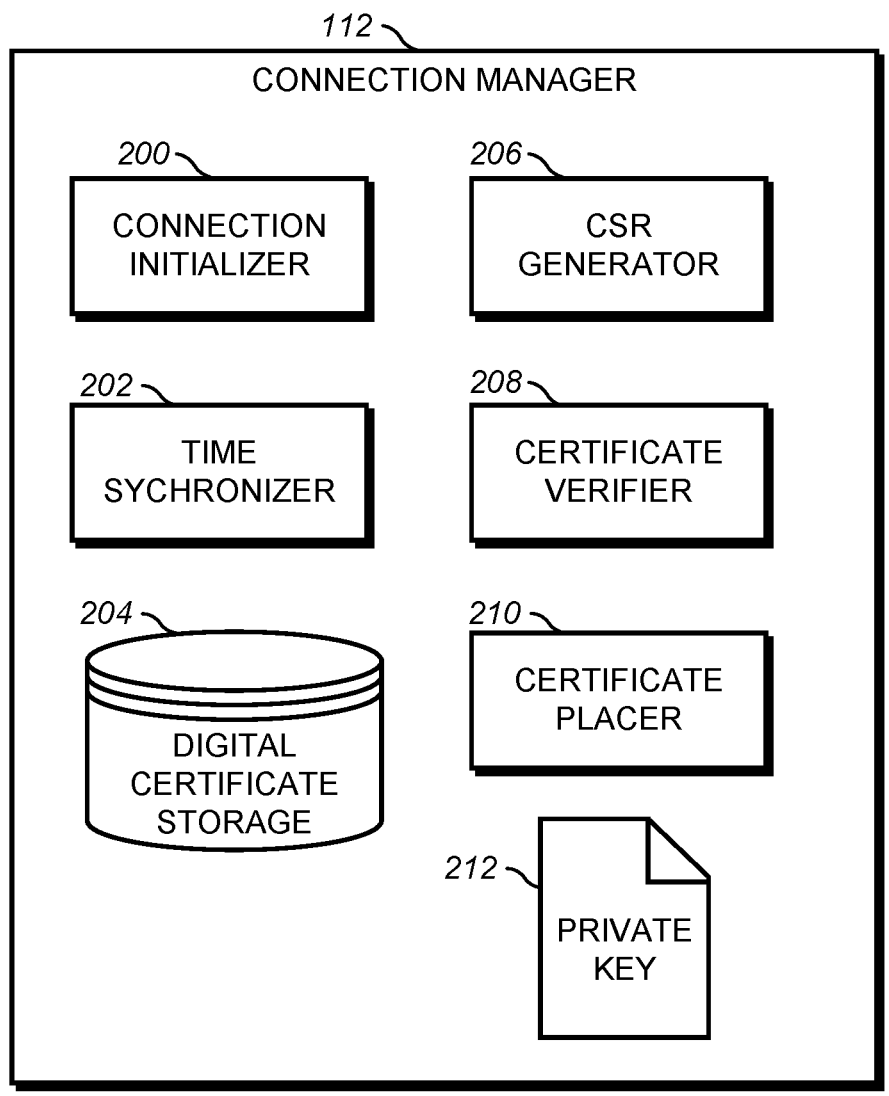
FIG. 2 is a block diagram representative of an example implementation of the connection manager of FIG. 1.

FIG. 2 depicts an example implementation of the connection manager 112 of FIG. 1. For purposes of illustration, the example connection manager 112 of FIG. 2 is the instance deployed on the printer 102 of FIG. 1. The example connection manager 112 of FIG. 2 includes a connection initializer 200, a time synchronizer 202, digital certificate storage 204 (e.g., memory designated for storing digital certificates), a CSR generator 206, a certificate verifier 208, a certificate placer 210, and a stored private key 212. As discussed in detail below, the connection manager 112 obtains and stores the digital certificates 204 to enable the printer 102 to securely perform respective functions, such as communicate with one or more external devices. Notably, upon receiving a digital certificate, the certificate verifier 208 checks the validity of the digital certificate prior to storing or otherwise implementing the digital certificate on the printer 102. For example, the certificate verifier 208 determines whether a received digital certificate is problematic before storing the digital certificate, and if a problem with the digital certificate is identified the certificate verifier 208 discards the received digital certificate and informs the host 108 that another digital certificate is needed. As such, the example certificate verifier 208 prevents one or more functions and/or hardware elements of the printer 102 from being rendered inoperable due to use of an erroneous or faulty digital certificate. Instead, the certificate verifier 208 improves performance (e.g., output, efficiency, speed, etc.) of the hardware (e.g., print mechanisms, communication interface, processor, etc.) by preventing harm caused by installation or other use of invalid digital certificates.

Other components of the example connection manager 112 of FIG. 2 are described below in connection with FIG. 4.

Figure 3:
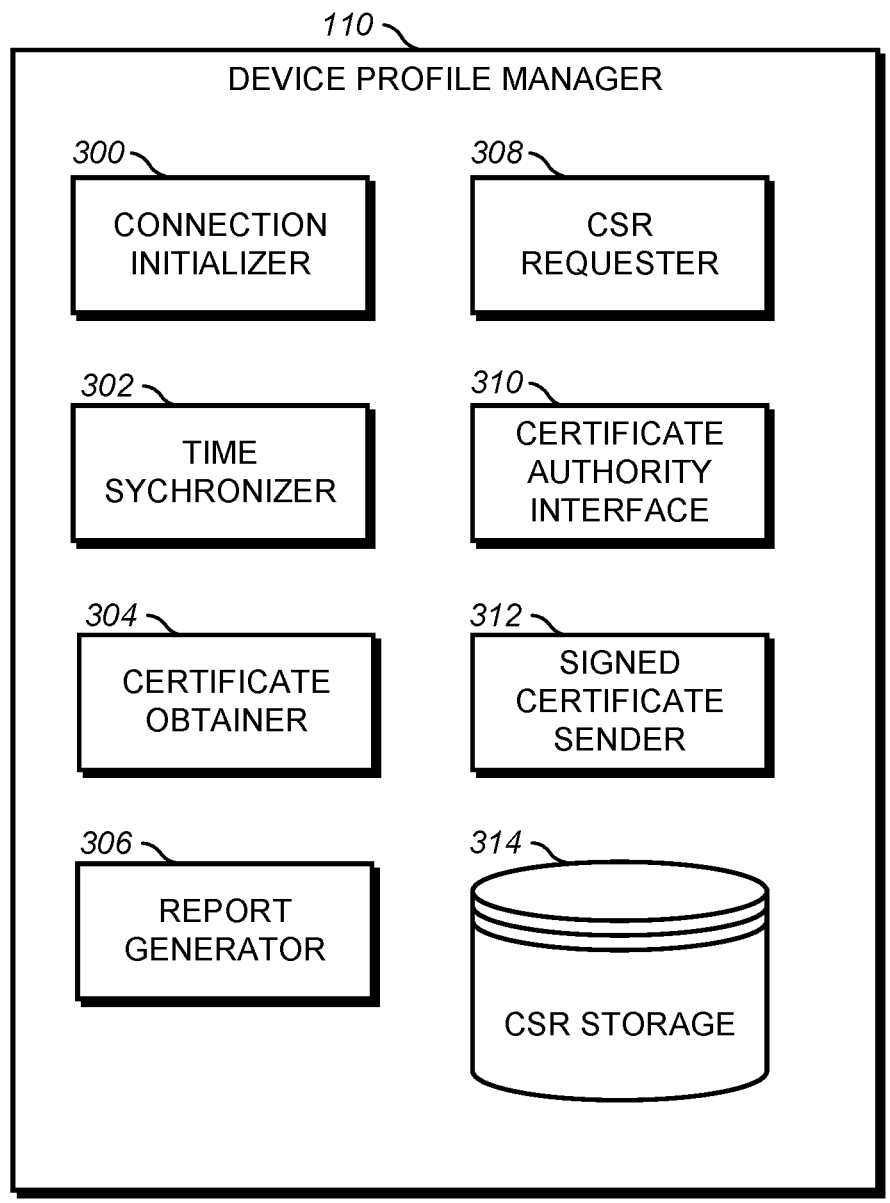
FIG. 3 is a block diagram representative of an example implementation of the device profile manager of FIG. 1.

FIG. 3 depicts an example implementation of the device profile manager 110 of FIG. 1. The example device profile manager 110 of FIG. 3 includes a connection initializer 300, a time synchronizer 302, a certificate obtainer 304, a report generator 306, a CSR requester 308, a certificate authority interface 310, a signed certificate sender 312, and CSR storage 314 (e.g., memory designated for storing CSRs). As described in detail below in connection with FIG. 4, the device profile manager 110 cooperates with instances of the connection manager 112 on the devices 102-106 to keep the digital certificates used by the devices 102-106 current and valid. Additionally, the device profile manager 110 provides the devices 102-106 an intermediary with the certificate authority 114 such that the devices 102-106 can dedicate resources (e.g., computing cycles and bandwidth) to core functions (e.g., printing, encoding, computing, and communicating instructions for the same) rather than communicating with the certificate authority 114.

Figure 4:
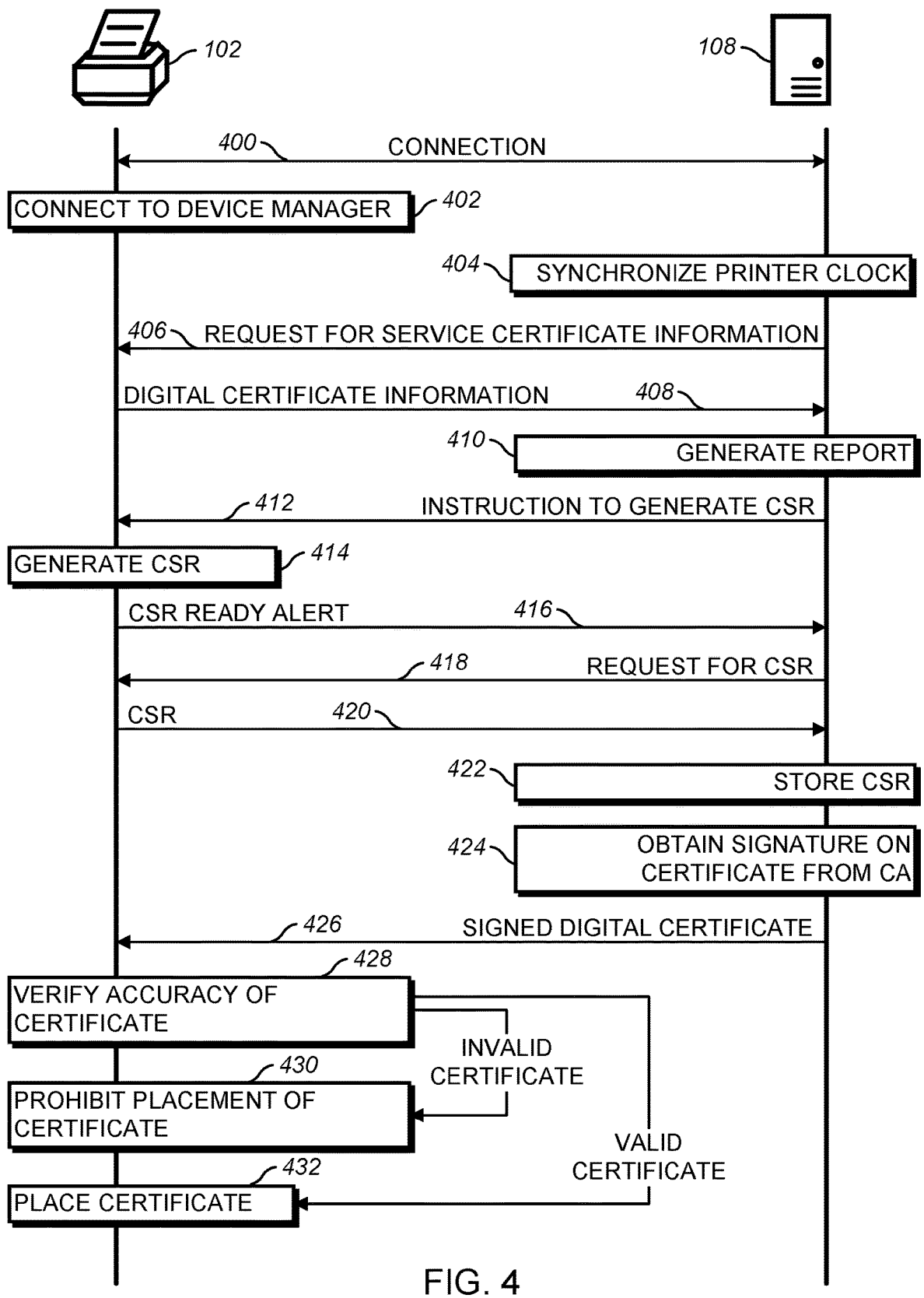
FIG. 4 is a flow diagram representative of example operations that may be executed to implement the example connection manager of FIGS. 1 and/or 2 and the example device profile manager of FIGS. 1 and 3.

FIG. 4 is flowchart representative example methods performed by the example connection manager of FIGS. 1 and/or 2 and the example device profile manager 110 of FIGS. 1 and/or 3. While the example of FIG. 4 is described in connection with FIGS. 2 and 3, the example methods of FIG. 4 may be implemented with additional or alternative implementations of the examples disclosed herein. Further, while the example of FIG. 4 is described in connection with the printer 102 of FIG. 1, the examples of FIG. 4 may be implemented in connection with any one of the devices 102-106 of FIG. 1 and/or any other suitable device.

In the example of FIG. 4, the printer 102 is placed in communication with the host 108 by the connection initializer 200 of the connection manager 112 cooperating with the connection initializer 300 of the device profile manager 110. In the illustrated example, the connection initializer 200 and the connection manager 112 establish a connection 400 (e.g., a communication channel) between the printer 102 and the host 108. In some examples, an external source instructs the printer 102 and/or the host 108 to find each other by, for example, the printer 102 being configured with an address of the host 108 (e.g., a weblink to the host 108), or the host 108 can search for devices on a network and provide instructions for discovered devices (such as the printer 102) to connect to the host 108.

In some instances, an internal clock of the printer 102 is unsynchronized with a clock of the host 108. Being time synchronized is important when analyzing aspects of digital certificates (e.g., expiration dates). Accordingly, the time synchronizer 202 of the printer 102 cooperates with the time synchronizer 302 of the host 108 to synchronize the clock of the printer 102 to the clock of the host 108 (block 404). In the example of FIG. 4, the time synchronizer 302 of the host 108 sends a set-get-do (SGD) command to the printer 102 to cause the printer to set the clock of the printer 102 to the current time of the host 108 in Linux Epoch format (e.g., number of seconds since Jan. 1, 1970). As such, the example time synchronizer 302 and the SGD command utilized thereby synchronize the printer 102 regardless of a time zone difference with the host 108 and/or other ones of the devices 102-106. With the clocks synchronized, expiration dates of digital certificates can be properly analyzed.

In the example of FIG. 4, the certificate obtainer 304 sends a request 406 for information associated with the digital certificates stored on the printer 102. In the example of FIG. 4, the certificate obtainer 304 utilizes an SGD command for the request 406 to obtain, for example, the service name and expiration date of each of the digital certificates. The SGD command used by the certificate obtainer 304 as the request 406 enables automation of the certificate renewal process. For example, a periodic request can be scheduled that automatically retrieves the certificate information, thereby ensuring that the host 108 is aware of the current digital certificates on the printer 102. In response to the request 406, the connection manager 112 accesses the digital certificates from the digital certificate storage 204 and sends the requested information 408 to the certificate obtainer 304.

In the example of FIG. 4, the certificate obtainer 304 provides the received information 408) to the report generator 306. In the illustrated example, the report generator 306 generates and populates a data structure (e.g., a table) with the information 408 associated with the digital certificates (block 410). In the example of FIG. 4, the received information 408 is JSON data and the report generator 306 parses the JSON data to identify, for example, a status of the digital certificates (e.g., already expired, active) and relevant information associated with the digital certificates (e.g., expiration dates of the digital certificates, a number of days until expiration for each of the digital certificates). Using the report, the device profile manager 110 of the host 108 determines when a digital certificate is nearing expiration and automatically initiate renewal thereof. The example device profile manager 110 is customizable in terms of, for example, an amount of time until expiration that triggers a renewal.

The CSR requester 308 of the host 108 sends an instruction 412 (e.g., when the device profile manager 110 determines that a digital certificate renewal is needed or scheduled) to the printer 102 to generate a CSR. In the example of FIG. 4, the CSR generator 206 of the printer 102 receives the instruction 412 and generates a CSR in accordance with the instruction 410 (block 414). The example instruction 410 of FIG. 4 includes fields and field values that define characteristics of the CSR to be generated. Example fields and values in the instruction 410 include a common name for the certificate, which algorithms are supported (e.g., Rivest, Shamir, and Adelman (RSA) and Elliptic Curve Digital Signature Algorithm (ECDSA)), a key size, a curve (when ECDSA is supported), country, locality, organization, state, organizational unit, and contact information. The example CSR generator 206 of FIG. 4 is configured to prohibit use of outdated security schemes (e.g., dated hash functions) and to prohibit use of size that do not adhere to industry accepted recommendations (e.g., set forth by the National Institute of Standards and Technology). In the example of FIG. 4, the CSR generator 206 evaluates the amount of entropy associated with the CSR generation and waits until there is sufficient entropy before generating the keys and the CSR. If the evaluated conditions and information are acceptable, the example CSR generator 206 generates the CSR and a corresponding private/public key pair. In some examples, the CSR generator 206 logs these events. When the CSR generator 206 has generated the CSR, the CSR generator 206 generates a CSR ready alert 416 and sends the same to the host 108.

If the CSR requester 308 of the host 108 determines that the printer 102 has a CSR ready for signing by a certificate authority 114, the CSR requester 308 sends a request 418 for a CSR to the printer 102. In the example of FIG. 4, the request 416 is an SGD get command. The printer 102 responds with the CSR 420. The example CSR requester 308 receives the CSR 420 and stores the same in the CSR storage 316 (block 422).

In the example of FIG. 4, the certificate authority interface 310 of the host 108 sends the CSR (e.g., according to SCEP/MSFT protocol) to the certificate authority 114 to obtain a corresponding signed digital certificate (block 424). If the certificate authority 114 verifies that the requester associated with the CSR is the true owner of the accompanying encryption information (e.g., public key), the certificate authority 114 sends a signed digital certificate 426 to the host 108 and the host 108 transmits the signed digital certificate 426 to the printer 102.

The certificate verifier 208 evaluates the validity of the received digital certificate 426 (block 428). In the illustrated example, the certificate verifier 208 performs the evaluation by determining whether prohibited or undesirable characteristics are present in the digital certificate 426. For example, the certificate verifier 208 determines whether a prohibited (e.g., according to customizable settings and/or demands of a security protocol) hash function was used to create the digital certificate. Additionally or alternatively, the certificate verifier 208 determines whether one or more sizes of elements of the digital certificate 426 fall outside a recommended or desired range. If any of the evaluated characteristics indicates an invalid digital certificate, the example certificate verifier 208 rejects the digital certificate 426 as invalid and prevents use of the same on the printer 102 (block 430), which would otherwise render one or more functions of the printer 102 inoperable. Additionally or alternatively, the certificate verifier 208 determines whether the validity period of the digital certificate 426 matches the printer time (i.e., local clock value). If not, the example certificate verifier 208 rejects the digital certificate 426 as invalid and prevents use of the same on the printer 102 (block 430), which would otherwise render one or more functions of the printer 102 inoperable. Additionally or alternatively, the certificate verifier 208 determines whether the digital certificate 426 is a match with the private key 212 currently in use on the printer 102 and/or the private key associated with the CSR 420. If not, the example certificate verifier 208 rejects the digital certificate 426 as invalid and prevents use of the same on the printer 102 (block 430), which would otherwise render one or more functions of the printer 102 inoperable.

If the certificate verifier 208 determines that the digital certificate 426 is valid, the example certificate placer 210 installs the digital certificate 426 on the printer 102 and/or stores the digital certificate 426 in the digital certificate storage 204. In some examples, only digital certificates present in the storage 204 are available for use on the printer 102 and the certificate placer 210 acts as a gatekeeper for the storage 204 by only allowing digital certificates verified by the certificate verifier 208 to be stored in the digital certificate storage 204.

Figure 5:
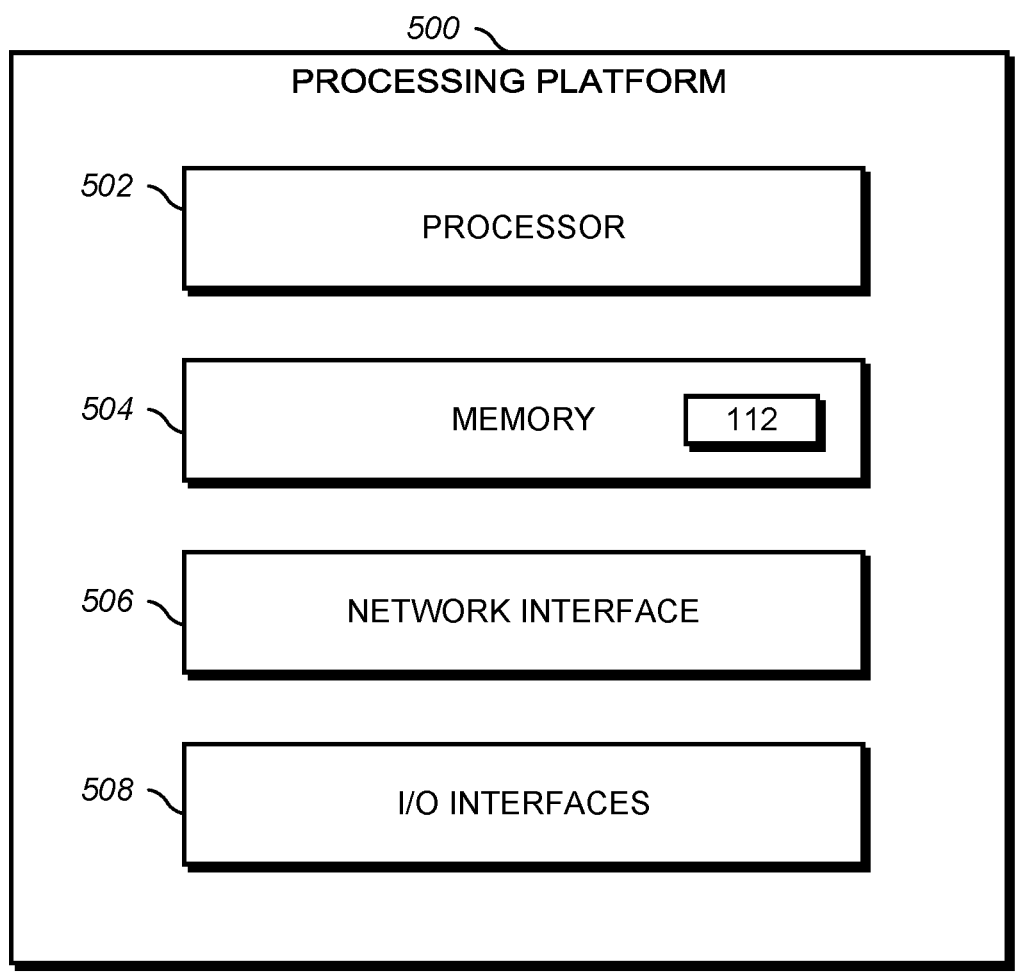
FIG. 5 is a block diagram representative of an example logic circuit capable of executing instructions to implement, for example, the connection manager of FIGS. 1 and 2 and/or the example device profile manager of FIGS. 1 and 3.

FIG. 5 is a block diagram representative of an example logic circuit that may be utilized to implement, for example, the example connection manager 112 of FIGS. 1 and/or 2 and/or the example device profile manager 110 of FIGS. 1 and/or 3 and/or, more generally, one or more of the devices 102-106 and/or the host 108. The example logic circuit of FIG. 5 is a processing platform 500 capable of executing instructions to, for example, implement the example operations represented by the flowcharts of the drawings accompanying this description. As described below, alternative example logic circuits include hardware (e.g., a gate array) specifically configured for performing operations represented by the flowcharts of the drawings accompanying this description.

The example processing platform 500 of FIG. 5 includes a processor 502 such as, for example, one or more microprocessors, controllers, and/or any suitable type of processor. The example processing platform 500 of FIG. 5 includes memory (e.g., volatile memory, non-volatile memory) 504 accessible by the processor 502 (e.g., via a memory controller). The example processor 502 interacts with the memory 504 to obtain, for example, machine-readable instructions stored in the memory 504 corresponding to, for example, the operations represented by the flowcharts of this disclosure. Additionally or alternatively, machine-readable instructions corresponding to the example operations of the flowcharts may be stored on one or more removable media (e.g., a compact disc, a digital versatile disc, removable flash memory, etc.) that may be coupled to the processing platform 500 to provide access to the machine-readable instructions stored thereon.

The example processing platform 500 of FIG. 5 includes a network interface 506 to enable communication with other machines via, for example, one or more networks. The example network interface 506 includes any suitable type of communication interface(s) (e.g., wired and/or wireless interfaces) configured to operate in accordance with any suitable protocol(s).

The example processing platform 500 of FIG. 5 includes input/output (I/O) interfaces 508 to enable receipt of user input and communication of output data to the user.

The above description refers to block diagrams of the accompanying drawings. Alternative implementations of the examples represented by the block diagrams include one or more additional or alternative elements, processes and/or devices. Additionally or alternatively, one or more of the example blocks of the diagrams may be combined, divided, re-arranged or omitted. Components represented by the blocks of the diagrams are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations represented by the flowcharts of this disclosure). Some example logic circuits are hardware that executes machine-readable instructions to perform operations (e.g., one or more of the operations represented by the flowcharts of this disclosure). Some example logic circuits include a combination of specifically configured hardware and hardware that executes machine-readable instructions.

The above description refers to flowcharts of the accompanying drawings. The flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations represented by the flowcharts are implemented by machine-readable instructions (e.g., software and/or firmware) stored on a medium (e.g., a tangible machine-readable medium) for execution by one or more logic circuits (e.g., processor(s)). In some examples, the operations represented by the flowcharts are implemented by one or more configurations of one or more specifically designed logic circuits (e.g., ASIC(s)). In some examples the operations of the flowcharts are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) can be stored. Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

As used herein, each of the terms "tangible machine-readable medium," "non-transitory machine-readable medium" and "machine-readable storage device" is expressly defined as a storage medium on which machine-readable instructions are stored for any suitable duration of time (e.g., permanently, for an extended period of time (e.g., while a program associated with the machine-readable instructions is executing), and/or a short period of time (e.g., while the machine-readable instructions are cached and/or during a buffering process)).

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

What is claimed is:

1. A method for use in a device configured to communicate using digital certificates, the method comprising:
   in response to an instruction to generate a certificate signing request (CSR), generating the CSR in accordance with the instruction, wherein generating the CSR comprises generating characteristics of the CSR, wherein the CSR characteristics prohibit the use of at least one of one or more outdated security schemes and one or more key sizes;
   transmitting the CSR;
   in response to a request, receiving, by the device, a new digital certificate to replace an existing digital certificate for use in secure communications between the device and another device;
   when the new digital certificate is received, prior to storing or otherwise implementing the new digital certificate on the device, evaluating, using a logic circuit of the device, the new digital certificate to determine a validity of the new digital certificate to replace the existing digital certificate, the evaluating comprises determining whether the new digital certificate utilizes any of the at least one of the one or more outdated security schemes and one or more key sizes prohibited by the CSR characteristics;
   when the new digital certificate is valid, allowing use of the new digital certificate by the device in place of the existing digital certificate; and
   when the new digital certificate is invalid, prohibiting use of the new digital certificate by the device and enabling the device to continue operating using the existing digital certificate despite receipt of the new digital certificate by the device.

2. The method of claim 1, further comprising, when the new digital certificate is invalid, notifying a host of the invalidity, wherein the host is configured to track expiration dates of digital certificates.

3. The method of claim 1, wherein the new digital certificate includes a public key of an asymmetric encryption scheme.

4. The method of claim 1, wherein determining the validity of the new digital certificate comprises determining whether the new digital certificate is based on an undesired encryption function.

5. The method of claim 4, wherein the undesired encryption function is a type of hash function.

6. The method of claim 1, wherein determining the validity of the new digital certificate comprises determining a size of a key associated with the new digital certificate.

7. The method of claim 1, wherein determining the validity of the new digital certificate comprises determining whether a validity period of the new digital certificate matches a time of the apparatus.

8. The method of claim 1, wherein determining the validity of the new digital certificate comprises determining whether the new digital certificate is a match with a private key of an asymmetric encryption scheme.

9. The method of claim 1, wherein prohibiting use of the new digital certificate by the device includes rejecting the new digital certificate and prohibiting storage of the new digital certificate on the device.

10. The method of claim 1, wherein prohibiting use of the new digital certificate when the new digital certificate is determined to be invalid comprises discarding the new digital certificate before installing the new digital certificate on the device.

11. The method of claim 1, wherein the device includes a digital certificate storage that stores the existing digital certificate for use on the device, the new digital certificate is received by the device to replace the existing digital certificate in the digital certificate storage, and prohibiting use of the new digital certificate when the new digital certificate is determined to be invalid comprises preventing the new digital certificate from being stored in the digital certificate storage.

12. An apparatus comprising:
   a request generator generates and transmits a certificate signing request (CSR); and
   a certificate verifier evaluates a new digital certificate received in response to the CSR to replace an existing digital certificate, wherein the certificate verifier is configured to:
      when the new digital certificate is received, prior to storing or otherwise implementing the new digital certificate on the device, determine whether the new digital certificate received by the apparatus is valid by determining whether the new digital certificate utilizes any of the at least one of the one or more outdated security schemes and one or more key sizes prohibited by the CSR characteristics;
      when the new digital certificate is valid, allow use of the digital certificate by the apparatus; and
      when the new digital certificate is invalid, prohibit use of the new digital certificate by the apparatus protecting the apparatus against negative impacts to functionality of the apparatus caused by the invalid digital certificate and enable the apparatus to continue operating using the existing digital certificate despite receipt of the new digital certificate by the device, wherein at least one of the request generator and the certificate verifier is implemented by a logic circuit of the apparatus.

13. The apparatus of claim 12, wherein the certificate verifier is configured to, when the new digital certificate is invalid, notify a host of the invalidity, wherein the host is configured to track expiration dates of digital certificates.

14. The apparatus of claim 12, wherein the new digital certificate includes a public key of an asymmetric encryption scheme.

15. The apparatus of claim 12, wherein the certificate verifier is configured to determine the validity of the new digital certificate by determining whether the digital certificate is based on an undesired encryption function.

16. The method of claim 15, wherein the undesired encryption function is a type of hash function.

17. The apparatus of claim 12, wherein the certificate verifier is configured to determine the validity of the new digital certificate by determining a size of a key associated with the new digital certificate.

18. The apparatus of claim 12, wherein the certificate verifier is configured to determine the validity of the new digital certificate by determining whether a validity period of the new digital certificate matches a time of the apparatus.

19. The apparatus of claim 12, wherein the certificate verifier is configured to determine the validity of the new digital certificate by determining whether the new digital certificate is a match with a private key of an asymmetric encryption scheme.

20. The apparatus of claim 12, wherein prohibiting use of the new digital certificate by the device includes rejecting the new digital certificate and prohibiting storage of the new digital certificate on the device.

21. A machine-readable storage device comprising instructions that, when executed, cause a machine to at least:
in response to an instruction to generate a certificate signing request (CSR), generate the CSR in accordance with the instruction, wherein the CSR comprises characteristics of the CSR, wherein the CSR characteristics prohibit the use of at least one of one or more outdated security schemes and one or more key sizes;
transmit the CSR;
in response to a request, receive a new digital certificate to replace an existing digital certificate for use in secure communications between the device and another device;
when the new digital certificate is received, prior to storing or otherwise implementing the new digital certificate on the device, evaluate, using a logic circuit, the new digital certificate to determine a validity of the digital certificate to replace the existing digital certificate, the new digital certificate is evaluated to determine whether the new digital certificate utilizes any of the at least one of the one or more outdated security schemes and one or more key sizes prohibited by the CSR characteristics;
when the new digital certificate is valid, allow use of the new digital certificate by the device in place of the existing digital certificate; and
when the new digital certificate is invalid, prevent use of the new digital certificate by the device certificate and enable continued operation using the existing digital certificate despite receipt of the new digital certificate.

* * * * *